United States Patent [19]

Schlienger

[11] Patent Number: 5,568,506
[45] Date of Patent: Oct. 22, 1996

[54] CONSTANT VOLTAGE ELECTRO-SLAG REMELTING CONTROL

[75] Inventor: Max E. Schlienger, Albuquerque, N.M.

[73] Assignee: Sandia Corporation, Albuquerque, N.M.

[21] Appl. No.: 442,545

[22] Filed: May 16, 1995

[51] Int. Cl.$^6$ ....................................................... H05B 3/60
[52] U.S. Cl. ................................. 373/50; 373/47; 373/70; 373/105
[58] Field of Search ................................. 373/42, 47, 50, 373/67, 70, 102, 104, 105

[56] References Cited

U.S. PATENT DOCUMENTS

| | | | |
|---|---|---|---|
| 4,075,414 | 2/1978 | Thomas | 373/105 |
| 4,096,344 | 6/1978 | Munson | 373/105 |
| 4,303,797 | 12/1981 | Roberts | 373/105 |
| 4,397,028 | 8/1983 | Dunn et al. | 373/94 |
| 4,742,528 | 5/1988 | Stenzel | 373/70 |
| 4,797,897 | 1/1989 | Stenzel et al. | 373/105 |
| 5,331,661 | 7/1994 | Maguire et al. | 373/105 |

*Primary Examiner*—Tu Hoang
*Attorney, Agent, or Firm*—George H. Libman

[57] ABSTRACT

A system for controlling electrode gap in an electro-slag remelt furnace has a constant regulated voltage and an eletrode which is fed into the slag pool at a constant rate. The impedance of the circuit through the slag pool is directly proportional to the gap distance. Because of the constant voltage, the system current changes are inversely proportional to changes in gap. This negative feedback causes the gap to remain stable.

14 Claims, 1 Drawing Sheet

CONSTANT VOLTAGE ELECTRO-SLAG REMELTING CONTROL

GOVERNMENT RIGHTS

The Government has rights to this invention pursuant to Contract No. DE-AC04-76DP00789 awarded by the U.S. Department of Energy.

BACKGROUND OF THE INVENTION

1. Field of the Invention (Technical Field)

The present invention relates to the control of Electro-Slag Remelting (ESR) furnaces, which are used to process metals and alloys to improve material quality. An electrode of the material to be processed is melted by the ESR process to produce a refined ingot. The process is characterized by the passage of current between the electrode and ingot through a molten, ionized slag. This slag is sufficiently heated by passage of current (Joule heating) so that the electrode is melted as it is immersed in the slag. The molten metal drips from the electrode through the slag and forms an ingot below.

2. Background Art

The ESR process is traditionally carried out commercially with alternating current (AC), and most control processors rely on RMS (root mean square) values of voltage and current to provide process information, while others gather information on the resistivity or conductivity of the AC circuit. Control of an ESR furnace is commonly achieved by maintaining a constant current and regulating the voltage between the electrode and the ingot. The electrode is servoed in an attempt to keep voltage constant, and a swing controller is employed to adjust the voltage that the ram servo system tries to maintain to keep the magnitude of oscillation (and thereby the immersion depth) constant. However, the control strategies currently used in industry do not provide for accurate control of electrode immersion depth, resulting in imperfections in the ingot being produced.

The difficulties in controlling ESR result largely from the fact that control systems relying on constant current operation are inherently unstable. The present invention is of a control system that is inherently stable due to employment of a substantially constant voltage rather than permitting voltage to change while holding current constant.

SUMMARY OF THE INVENTION (DISCLOSURE OF THE INVENTION)

The present invention is of a method and apparatus for controlling a gap between an electrode and a molten metal pool within a slag pool of an electro-slag remelting furnace, comprising: immersing the electrode in the slag pool; establishing an electrical circuit through the electrode and the slag pool; and maintaining a substantially constant voltage over the electrical circuit for a period sufficient for the electrode to substantially completely melt. In the preferred embodiment, a constant voltage power supply is employed and/or computer control of the power supply to maintain a constant voltage by commanding changes in current output. Solidifaction rate is the key element for the production of high quility material. Under constant voltage conditions, the metal to be melted can be fed into the furnace at a constant rate and the furnace system itself will stablize at the conditions necessary to melt the material at the feed rate. Under constant voltage conditions, the solidifaction rate is stabilized by, and a function of, the feed rate because the furnace system adjusts such that the melt rate will equal the feed rate and the solidifaction rate must equal the melt rate under steady rate conditions. This eliminates the variations in power and melt rate which can result under control schemes which rely on eletrode motion to stabilized the system, the voltage does not vary more than 7 volts from a set point, more preferably, not more than 5 volts, and most preferably not more than 1 volt. A feed rate is set for the electrode, thereby establishing a substantially identical electrode melt rate. The invention is of particular value in the processing of contaminated electrodes, such as electrodes contaminated with radio nuclides on the surface thereof.

A primary object of the present invention is to provide a control system for electro-slag remelting that is not inherently unstable.

Another object of the present invention is to provide such a system which employs a constant voltage power supply.

A primary advantage of the present invention is that it drives itself toward steady state operation, unlike existing constant current systems.

A resulting advantage of the present invention is that it permits tighter process control over electro-slag remelting procedures, which in turn results in improved quality in resulting ingots (fewer freckles, breakouts, and other defects) and higher yields.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention.

BRIEF DESCRIPTION OF THE DRAWING

The accompanying drawing, which is incorporated into and forms a part of the specification, illustrates several embodiments of the present invention and, together with the description, serves to explain the principles of the invention. The drawing is only for the purpose of illustrating a preferred embodiment of the invention and is not to be construed as limiting the invention. In the drawing.

Figure 1:
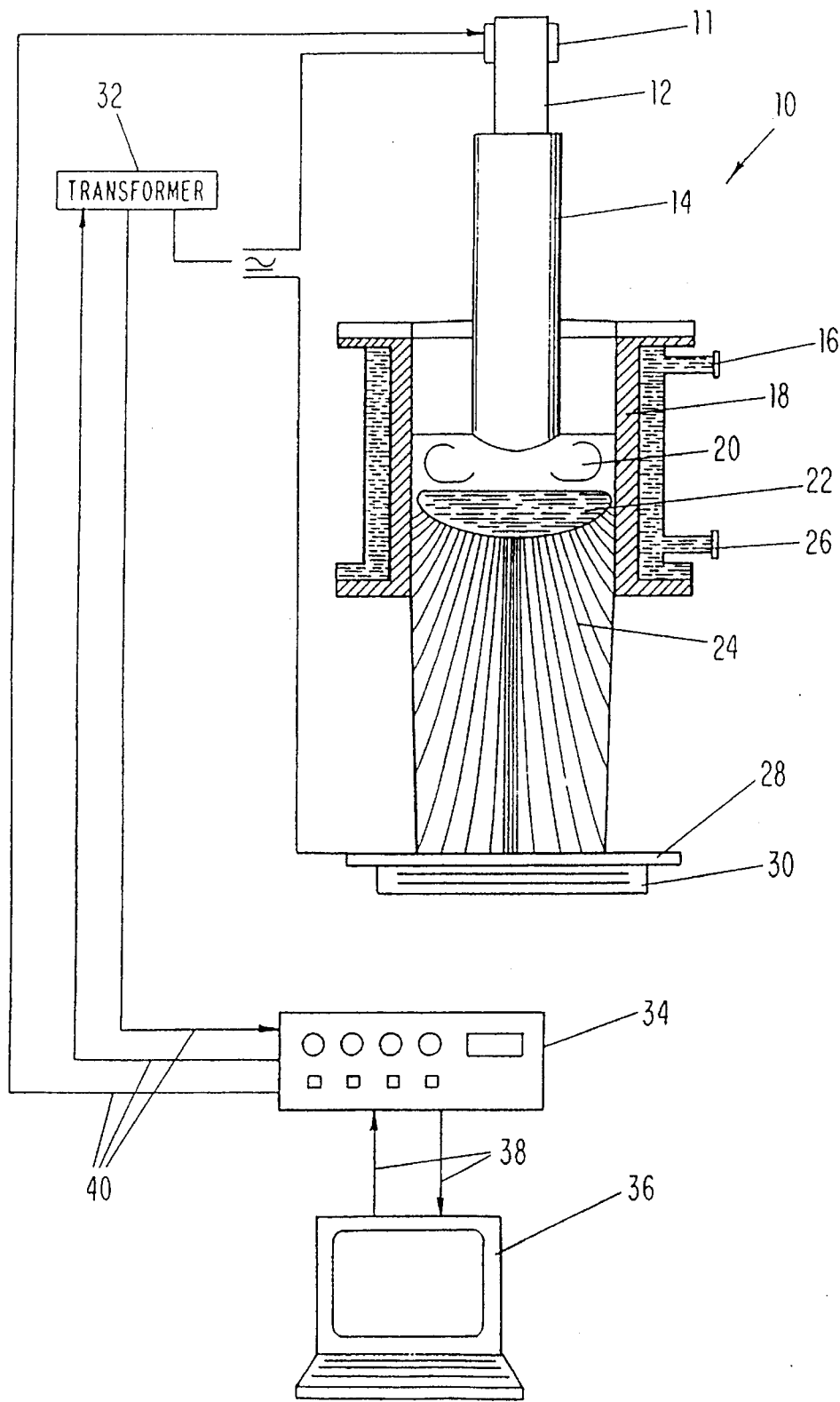
FIG. 1 is a block diagram of the preferred control apparatus of the invention.

DESCRIPTION OF THE PREFERRED EMBODIMENTS (BEST MODES FOR CARRYING OUT THE INVENTION)

The present invention is of a control method and apparatus for Electro-Slag Remelting (ESR) that deviates significantly from that typically used in industry. The invention substantially stabilizes the ESR process, thereby providing tighter process control resulting in improved quality and process yields.

During the ESR process, an electrode is melted into an ingot by being immersed into a bath of molten slag (FIG. 1). The slag is maintained in a molten state by the passage of current through the electrode and into the slag.

As the electrode melts, a method of feeding additional electrode into the slag to compensate for that which has melted is necessary. Present day practices accomplish this by utilizing a constant current power supply and then trying to keep the immersion depth of the electrode in the slag constant. The immersion depth is sensed by measuring the electrode voltage and a voltage swing signal. A deviation in the voltage swing signal causes an appropriate adjustment to a voltage set point which affects the electrode drive speed and thereby the immersion depth. It is metallurgically desirable to maintain a constant solidification rate. It is generally agreed that if the melt rate is kept at a constant value, the ingot being formed will eventually achieve a constant solidification rate.

Although the above described mode of operation has been used in production for many years, there is still room for improvement. To this end, an alternative method which vastly simplifies the control task has been developed.

Steady state operation is the desired outcome of the application of a control system to the ESR process. With this as the goal, such operation may be said to exist when the distance between the electrode and the molten metal pool, hereafter referred to as the gap, remains constant. A constant gap results when the melt rate (M) and the feed rate (F) are exactly equal. A difference equation for the gap (g) may be written to express this as follows:

$$g_{i+1} = g_i + (M-F)\Delta t \quad (1)$$

Eq. 1 describes the gap. If the melt rate and the feed rate are the same, the gap does not vary. If however the melt rate exceeds the feed rate, then the gap increases. If the feed rate is held constant, a system response may be determined by evaluating the melt rate. To a first order approximation it may be said that the melt rate (M) is proportional to the power input into the slag. This energy is the product of the RMS electrode voltage (V) and the applied RMS current (I). Therefore the melt rate (M) may be expressed as:

$$M = AVI \quad (2)$$

where A is a proportionality constant. If, as is typical, a constant current power supply is used, the power supply acts by modifying the output voltage to maintain a constant current. For this operating mode, the electrode voltage (V) may be expressed as the product of the current (I) and the slag impedance (Z):

$$V = IZ \quad (3)$$

for constant current operation. Experiments have shown the slag impedance Z is a complex function of immersion depth (or gap) and that Z increases at an ever increasing rate as the electrode bottom approaches the surface of the slag cap. However for this analysis the impedance is assumed to be a linear function of the gap which is a conservative approximation of the effect of the gap on impedance. This assumption results in the expression for Z:

$$Z = Bg \quad (4)$$

where B is a proportionality constant and g is gap. Combining Eqs. 3 and 4 allows the melt rate expression of Eq. 2 to be re-written as:

$$M = ABI^2g \quad (5)$$

Substituting the revised melt rate expression of Eq. 5 into the difference equation for the gap yields:

$$g_{i+1} = g_i + (ABI^2 g_i - F)\Delta t \quad (6)$$

Examination of Eq. 6 reveals that a perturbation of the gap results in a positive feedback effect which causes the perturbation to increase with time. In other words, the ESR process when operated with a constant current power supply is inherently unstable and present voltage control schemes are constantly swinging back and forth through an optimum gap to try and maintain a constant feed rate. If the optimum feed rate is achieved, any process transient is sufficient to allow the system to drive away from equilibrium and unless corrective action is taken the result will be an electrode that either pulls out of the slag completely or dives into the molten metal pool.

If the system is reconfigured such that the power supply operates in a constant voltage mode, a very different response results. During constant voltage operation the power supply varies the current output to maintain a constant voltage. For the constant voltage operating mode, the power supply current (I) may be expressed as:

$$I = \frac{V}{Z} \quad (7)$$

This result in conjunction with the expression for impedance of Eq. 4 allows the melt rate to be written as:

$$M = \frac{AV^2}{Bg} \quad (8)$$

where A and B are proportionality constants and g is the gap.

This expression for melt rate may now be substituted into the difference equation for gap yielding the constant voltage power supply version of the gap equation:

$$g_{i+1} = g_i + \left(\frac{AV^2}{Bg_i} - F\right)\Delta t \quad (9)$$

for constant voltage operation. Examination of this result reveals that a deviation in the gap results in a corrective force. Hence gap fluctuations have a negative feedback effect and the process is inherently stable. This discovery is the basis of the electro-slag remelting control system of the present invention.

In operation this control mode is achieved by operating the process power supply in a constant voltage mode and feeding the electrode into the slag bath at a constant velocity. If the feed rate is too large to support the equilibrium gap, then the gap begins to decrease. Such a decrease in the gap lowers the slag impedance Z and in order to maintain its output voltage, the power supply increases the current which results in an overall increase in power and hence melt rate. The outcome of this action is that a new equilibrium gap is established at a position in the slag that will support the feed rate.

An important advantage of the present invention is that a steady melt rate can be achieved merely by setting the electrode feed rate. Once this has been done, the furnace system will automatically come to the necessary equilibrium to support this feed rate. Utilization of this phenomenon results in a control system that is much less complex, far more robust and far more stable than those which are currently in use. Such a control system drives itself toward steady state operation and as such provides significant improvements in ESR material quality and yield.

An important application of the present invention is its enhanced ability to process waste materials, such as metals contaminated on the surface with radio nuclides. The constant feed rate and low level of disturbance caused by electrode feed achievable with the present invention permits the stable environment necessary for thorough processing of such waste materials.

FIG. 1 illustrates the preferred apparatus 10 of the present invention. The electro-slag remelting furnace comprises electrode clamp 11, stinger 12, electrode 14, cooling water in 16, mold 18, slag pool 20, molten metal pool 22, ingot 24, cooling water out 26, starting plate 28, water cooling 30, and transformer 32. The furnace itself is conventional except for transformer 32, which provides a constant voltage rather than a constant current.

The system further comprises control panel 34 and control computer 36, which are operably connected by data pathways 38. Control panel 34 is operably connected to the ESR furnace by electrical pathways 40 which permit issuance of commands to control positioning of electrode 14 and commands to transformer 32 to maintain constant voltage (preferably by closed loop control to within 5–7 volts of the set point) and which permit data to be gathered from the transformer about the AC circuit formed by the ESR furnace. Control panel 34 preferably also receives, as is well known, data concerning electrode position, electrode weight, electrode drive speed, mold position (for furnaces with moving molds), mold drive speed (also for furnaces with moving molds), and water flow rates.

Control computer 36, preferably comprising a memory, processor, input devices (e.g, keyboard and mouse), and display screen, has software or firmware implementing the preferred control algorithm discussed above, such as by a P-I controller implemented on an IBM-PC compatible microcomputer. Control computer 36 may be implemented within control panel 34, rather than as a physically separate entity.
Industrial Applicability:

The invention is further illustrated by the following non-limiting

EXAMPLE 1

A series of ESR melts were performed using the control process of the present invention in a small ESR furnace located at Sandia National Laboratories, Albuquerque, New Mex. Table 1 summarizes the operating conditions for four melts having constants as follows: alloy 625, density 8.44 gm/cc, 8" into 10", 60-20-20 slag, feed ratio 1.64.

TABLE 1

| Ingot # | Voltage | Melt Rate | Slag Cap Charge |
|---|---|---|---|
| E63 | 30 | 2.45 kg/min–2.8 mm/min | 13 kg |
| E63 | 33 | 2.45 kg/min–2.8 mm/min | 13 kg |
| E63 | 36 | 2.45 kg/min–2.8 mm/min | 13 kg |
| E64 | 33 | 2.71 kg/min–3.1 mm/min | 22 kg |
| E64 | 36 | 2.71 kg/min–3.1 mm/min | 22 kg |
| E64 | 39 | 2.71 kg/min–3.1 mm/min | 22 kg |
| E65 | 24 | 1.60 kg/min–1.8 mm/min | 22 kg |
| E65 | 30 | 1.60 kg/min–1.8 mm/min | 22 kg |
| E65 | 37 | 1.60 kg/min–1.8 mm/min | 22 kg |
| E66 | 30 | 4.00 kg/min–4.5 mm/min | 13 kg |
| E66 | 34 | 4.00 kg/min–4.5 mm/min | 13 kg |
| E66 | 38 | 4.00 kg/min–4.5 mm/min | 13 kg |

Table 2 summarizes the operating conditions for four melts having constants as follows: alloy 1018, 8" into 10", 33-33-33 slag, feed ratio 1.64. Melt E70 was used to test an industrial controller, a Honeywell UDC 6000, as a means of controlling the power supply as a constant voltage device. Melt E71 employed an electrode diameter stepped from an 8" down to a 4" diameter, which demonstrated that the constant voltage mode is self stabilizing even when faced with significant geometrical changes. Melt E73 integrated constant voltage control into the controller.

TABLE 2

| Ingot # | Voltage | Melt Rate | Slag Cap Charge |
|---|---|---|---|
| E70 | 35 | 2.45 kg/min–2.8 mm/min | 13 kg |
| E71 | 36 | 2.45 kg/min–Varied | 13 kg |
| E73 | 32–40 | 2.45 kg/min–2.8 mm/min | 13 kg |

In all cases the ESR melt process was stable. The results represent a fairly large parameter space and indicate that stability may be achieved across a wide range of operating conditions.

Step changes in voltage resulted in current excursions which damped to new steady state values. After a parameter change, stable operation at the new parameters usually occurred within five minutes. Step changes in electrode position also resulted in step changes in current which quickly came to equilibrium. These results suggest that pipe and electrode taper may be accommodated by the present invention, preferably with the addition of feed forward control.

In the present invention, the current fluctuates about an equilibrium value. The magnitude of the current excursions seems to vary with immersion depth and seems to vanish completely at immersions deeper than 7 to 10 mm.

The results indicate that higher stable operating voltages are obtainable under the present invention. For example, under similar conditions for this test furnace under constant current mode, 33 volts was the maximum achievable, while 39 volts was achieved under constant voltage mode. Also, automatic "hot topping" type behavior was observed. As the melt approached its conclusion, ingot heating reduced the power necessary to maintain the constant feed/melt rate. At constant voltage and feed rate, the current backs off significantly near the end of the electrode. This is not a true "hot top", but rather an inherent system characteristic in response to changing thermal conditions and the imposed requirement of constant melt rate. Very shallow immersion depths were observed—too small to measure. Stable operation was achieved where the process exhibited a continuous loud hum, and yet the electrode did not pull out of the slag and pop. At the conclusion of the melts, feeding was simply stopped. The current automatically backed down to near zero and the power supply popped up to open circuit as the electrode smoothly melted out of the slag.

During one melt, the stub was intentionally melted into for a change of diameter of 4.5" (8" to 3.5") or a change in electrode cross-section of 50.26–9.62=40.6 square inches for an 81% reduction in cross-section. At the onset of this change in cross-sectional area, the current dropped drastically, the electrode melted out of the slag briefly, the electrode re-entered the slag and the current stabilized at a lower value.

EXAMPLE 2

The stability of the process of the invention was confirmed on industrial furnaces. The motion of the furnace ram was reduced to a constant velocity, which is important because of the need in modern ESR systems to oscillate the electrode within the slag. The elimination of the electrode motion, coupled with the reductions in the variations of process voltage and current, reduces process variability and allows the characterization of process efficiency. The process may accordingly be tuned for optimum energy usage. The inherent stability of the process of the present invention provides a more reliable method of tuning immersion depth for optimum melting. Further, the reduction of variability in the characteristic signals allows second order effects to be readily observed and utilized in future control schemes working from the present invention.

In one case a poor ingot surface was expected but did not manifest under constant voltage operation. Typically the molten metal would break through the slag skin and run down the outside of the ingot forming large flashings. No such breakouts were observed. It seems likely that the lack of electrode motion (only downward at the melt rate as opposed to a continuous up/down motion) may reduce flow anomalies that can break the slag skin. Further, this lack of motion may also provide less opportunity for the nucleation of freckles (a type of solidification defect) thereby producing higher quality material.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for controlling a gap between an electrode and a molten metal pool within a slag pool of an electro-slag remelting furnace, the method comprising the steps of:

immersing the electrode in the slag pool;

applying substantially constant voltage across an electrical circuit including in series, the electrode, the gap and the molten metal pool, whereby current through the circuit heats the slag pool which thereby melts the electrode; and moving the electrode towards the slag pool at a constant feed rate, a change in gap distance causing a directly proportional change in impedance through the slag which causes an inversely proportional change in current through the constant voltage circuit, this current change causing a change in the rate of melt of the electrode, thereby stabilizing the gap distance.

2. The method of claim 1 wherein the applying step comprises the step of providing a constant voltage power supply.

3. The method of claim 1 wherein the applying step comprises the step of providing a power supply and computer means for maintaining the power supply at a constant voltage by commanding changes in current output.

4. The method of claim 1 wherein the applying step comprises maintaining a voltage over the electrical circuit such that the voltage does not vary more than 7 volts from a predetermined voltage.

5. The method of claim 4 wherein the applying step comprises maintaining a voltage over the electrical circuit such that the voltage does not vary more than 5 volts from a predetermined voltage.

6. The method of claim 5 wherein the applying step comprises maintaining a voltage over the electrical circuit such that the voltage does not vary more than 1 volt from a predetermined voltage.

7. The method of claim 1 wherein the immersing step comprises immersing a contaminated electrode.

8. A apparatus for controlling a gap between an electrode and a molten metal pool within a slag pool of an electro-slag remelting furnace, said apparatus comprising:

means for immersing the electrode in the slag pool;

means for applying a substantially constant voltage across an electrical circuit including in series, the electrode, the gap and the molten metal pool, whereby current through the circuit heats the slag pool which thereby melts the electrode; and means for moving the electrode towards the slag pool at a constant feed rate, a change in gap distance causing a directly proportional change in impedance through the slag which causes an inversely proportional change in current through the constant voltage circuit circuit, the current change causing a change in the rate of melt of the electrode, thereby stabilizing the gap distance.

9. The apparatus of claim 8 wherein the applying means comprises a constant voltage power supply.

10. The apparatus of claim 8 wherein the applying means comprises a power supply and computer means for maintaining the power supply at a constant voltage by commanding changes in current output.

11. The apparatus of claim 8 wherein the applying means comprises means for maintaining a voltage over the electrical circuit such that the voltage does not vary more than 7 volts from a predetermined voltage.

12. The apparatus of claim 11 wherein the applying means comprises means for maintaining a voltage over the electrical circuit such that the voltage does not vary more than 5 volts from a predetermined voltage.

13. The apparatus of claim 12 wherein the applying means comprises means maintaining a voltage over the electrical circuit such that the voltage does not vary more than 1 volt from a predetermined voltage.

14. The apparatus of claim 8 wherein the immersing means comprises means for immersing a contaminated electrode.

* * * * *